(12) United States Patent
Guey et al.

(10) Patent No.: US 9,130,615 B2
(45) Date of Patent: Sep. 8, 2015

(54) CHANNEL ESTIMATION FOR A VERY LARGE-SCALE MULTIPLE-INPUT MULTIPLE-OUTPUT (MIMO) SYSTEM

(71) Applicant: TELEFONAKTIEBOLAGET L M ERICSSON (PUBL), Stockholm (SE)

(72) Inventors: Jiann-Ching Guey, Hsinchu (TW); Kumar Balachandran, Pleasanton, CA (US); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/182,372

(22) Filed: Feb. 18, 2014

(65) Prior Publication Data

US 2014/0219377 A1    Aug. 7, 2014

Related U.S. Application Data

(62) Division of application No. 13/342,688, filed on Jan. 3, 2012, now Pat. No. 8,837,621.

(60) Provisional application No. 61/484,047, filed on May 9, 2011.

(51) Int. Cl.
*H04B 7/02* (2006.01)
*H04B 7/04* (2006.01)
(Continued)

(52) U.S. Cl.
CPC ............ *H04B 7/0413* (2013.01); *H04B 7/0691* (2013.01); *H04L 5/0023* (2013.01); *H04L 5/0048* (2013.01); *H04L 25/0232* (2013.01); *H04B 7/0626* (2013.01); *H04L 2025/03808* (2013.01)

(58) Field of Classification Search
CPC .............. H04L 25/0232; H04L 5/0048; H04L 2025/03426; H04B 7/0413; H04B 7/0684; H04B 7/0626; H04B 7/0691
See application file for complete search history.

(56) References Cited

U.S. PATENT DOCUMENTS 7,428,269 B2    9/2008   Sampath et al.
2007/0053282 A1*  3/2007   Tong et al. ................... 370/208
(Continued)

FOREIGN PATENT DOCUMENTS

EP          2 169 888 A1    3/2010
WO      WO 2010/050874 A1    5/2010

OTHER PUBLICATIONS

Hammarwall, et al. Spatial Transmit Processing Using Long-Term Channel Statistics and Pilot Signaling on Selected Antennas. IEEE Fortieth Asilomar Conference on Signals. Oct. 1, 2006.

*Primary Examiner* — Kenneth Lam

(57) ABSTRACT

A transmitter, receiver, and method for channel estimation for a Multiple-Input Multiple-Output (MIMO) communication system in which the transmitter includes a multiplicity of transmit antennas spaced such that spacing between adjacent antennas provides a spatial correlation coefficient greater than a threshold level. The transmitter selects a subset of the multiplicity of transmit antennas for transmitting the pilot reference signals. The pilot reference signals are transmitted only from the selected subset of transmit antennas to the receiver. The receiver includes a channel estimator configured to derive a channel estimation for all of the multiplicity of transmit antennas using the received pilot reference signals and known or estimated spatial correlation among the multiplicity of transmit antennas.

6 Claims, 8 Drawing Sheets

(51) Int. Cl.
*H04B 7/06* (2006.01)
*H04L 5/00* (2006.01)
*H04L 25/02* (2006.01)
*H04L 25/03* (2006.01)

(56) References Cited

U.S. PATENT DOCUMENTS

| | | |
|---|---|---|
| 2007/0099584 A1 | 5/2007 | Niu et al. |
| 2008/0107196 A1 | 5/2008 | Won |
| 2009/0129498 A1* | 5/2009 | Nakamura et al. ............ 375/267 |
| 2009/0232243 A1* | 9/2009 | Tsuboi et al. ................ 375/267 |
| 2009/0279486 A1* | 11/2009 | Kishigami et al. ............ 370/329 |
| 2009/0305726 A1* | 12/2009 | Rick et al. .................. 455/456.1 |
| 2010/0087151 A1* | 4/2010 | Auer ........................... 455/67.11 |
| 2010/0246494 A1 | 9/2010 | Sanayei |
| 2010/0246638 A1* | 9/2010 | Mehta et al. .................. 375/133 |
| 2011/0064156 A1 | 3/2011 | Kim et al. |
| 2011/0075743 A1* | 3/2011 | Koike et al. .................... 375/259 |
| 2011/0205930 A1 | 8/2011 | Rahman et al. |
| 2011/0274188 A1 | 11/2011 | Sayana et al. |
| 2012/0009980 A1* | 1/2012 | Zhang et al. ................ 455/562.1 |

\* cited by examiner

CHANNEL ESTIMATION FOR A VERY LARGE-SCALE MULTIPLE-INPUT MULTIPLE-OUTPUT (MIMO) SYSTEM

CROSS-REFERENCE TO RELATED APPLICATIONS

This application is a divisional of co-pending U.S. patent application Ser. No. 13/342,688 filed on Jan. 3, 2012, which claims the benefit of U.S. Provisional Application No. 61/484,047 filed May 9, 2011, the disclosures of which are fully incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to wireless communication systems. More particularly, and not by way of limitation, the present invention is directed to a transmitter, receiver, and method for channel estimation for a Multiple-Input Multiple-Output (MIMO) communication system.

Recent advances in wireless communications have caused a revolution in the Internet by extending broadband coverage to wireless users. Table 1 below is a classification of past, present, and future cellular technologies. It is seen that wireless cellular technologies have progressively and systematically raised their performance levels by an order of magnitude over previous generations. Spectral efficiency and data rate are key metrics that have improved. Some of this improvement has come about due to increases in the allocated spectrum, while other improvements are the result of technological advances, the most important of which have been the introduction of flexible and adaptive channel coding and modulation, dynamic link adaptation to choose the best data rate for the radio channel conditions, and the introduction of Multiple-Input Multiple-Output (MIMO) systems that utilize multiple antennas at the transmitter and or receiver to improve the number of degrees of freedom available to reach the users (or to receive from them). Similar advances have also been made by standards developed by the Institute of Electrical and Electronics Engineers (IEEE) within the Wireless Local Area Network (WLAN) standard IEEE 802.11, as further developed by the WiFi alliance.

TABLE 1

| | ITU-R Classification | | |
| --- | --- | --- | --- |
| — | | IMT-2000 | IMT-Advanced |
| 1G | 2G | 3G | 4G |
| AMPS/NMT | GSM/EDGE EIA/TIA-136 EIA/TIA-95 | GSM/WCDMA/ HSPA/EDGE CDMA2000/evDO 3GPP LTE Rel. 8 | 3GPP LTE Rel. 10 |
| Analog | Digital | Digital | Digital |
| <100 KHz | <1 MHz | <10 MHz | <100 MHz |
| 400-1000 MHz | 400-2000 MHz | 400-3000 MHz | 200-5000 MHz |

TABLE 1-continued

| | ITU-R Classification | | |
| --- | --- | --- | --- |
| — | | IMT-2000 | IMT-Advanced |
| 1G | 2G | 3G | 4G |
| <10 kb/s/user Voice telephony 1985-1999 | <1 Mb/s/cell Voice/data 1992-present | <100 Mb/s/cell Voice/data 2002-present | <1 Gb/s/cell Data (voice included) 2009-present |

MIMO antenna systems increase the throughput of a wireless communication link without bandwidth expansion. Through proper design of the signal-transmission scheme and the corresponding receiver algorithm, the MIMO channel may be decomposed into parallel non-interfering channels. The number of such parallel channels, or streams, is the smaller of the number of transmit antennas and the number of receive antennas. When all the receive antennas are attached to the same User Equipment (UE), the system is referred to as Single-User MIMO (SU-MIMO). When the receive antennas are distributed among multiple UEs, the system is referred to as Multi-User MIMO (MU-MIMO). Because of its great potential in bandwidth efficiency, MIMO has been adopted by most wireless communication standards such as Long Term Evolution (LTE), WiMax, and WiFi.

In order to exploit the potential of the MIMO channel, it is critical to have knowledge of the MIMO channel state information. This information is needed for the receiver to perform the demodulation of transmitted data symbols. It is also needed sometimes at the transmitter to properly shape the transmit signal to improve Signal to Interference and Noise Ratio (SINR) at the receiver.

In a wireless communication system employing Orthogonal Frequency Division Multiplexing (OFDM), the channel state information can be modeled as a slowly varying, 2-dimensional, complex time-frequency process. Known Reference Signals (RS), i.e, pilot symbols, are transmitted at various time instants and frequencies.

FIG. 1 illustrates a pilot RS for MIMO in an LTE system. When the RSs are properly distributed across the time-frequency plane, the receiver can use these known symbols to reconstruct the full channel response. Naturally, the density of the pilots depends on the rate at which the channel varies in time and frequency. For LTE employing two transmit antennas, the pilots are transmitted at a higher density, as shown in FIG. 1. For four transmit antennas, the last two antennas have lower pilot density since it is anticipated that the channel variation is slower for the scenarios that can exploit four antennas.

Since the antennas are co-located, the transmit signals interfere severely with each other. In order for the receiver to receive the pilots without interference, an antenna mutes its transmission at the locations where pilots are transmitted by other antennas, as marked by the shaded areas. In total, 24 resource elements out of every 168 are reserved overhead for pilot transmission in LTE.

Recently, there have been growing interests in extending the MIMO system to a very large number of transmit and receive antennas. Instead of four to eight antennas typically employed in current systems, the number of antennas envisaged in these recent studies ranges in the order of 100 or more. Supported by the random matrix theory, it has been suggested that the required energy per bit vanishes as the number of antennas goes to infinity.

SUMMARY

Even if the theory holds for an arbitrarily large number of antennas and that the hardware can support the construction of such a large array in practice, the number of transmit antennas will still be limited by the overhead their pilot symbols occupy. Using LTE as an example, if 24 out of 168 resource elements are required to support four transmit antennas, then the largest number of antennas the LTE system can support is 28. At that level, however, there will be no resource element left for data transmission.

The present invention provides a solution to the above-mentioned problems. In exemplary embodiments of the invention, only a subset of a multiplicity of antennas transmits pilot symbols, and then the spatial correlation among closely placed antennas is exploited to derive the channel estimation for all antennas. This spatial correlation may be estimated or may be known a priori. A Minimum Mean Square Estimator (MMSE), for example, may be used to interpolate the channel for antennas that do not transmit pilot symbols.

In one embodiment, the present invention is directed to a method of transmitting pilot reference signals utilized by a receiver for channel estimation in a MIMO communication system in which a transmitter utilizes a plurality of transmit antennas. The method includes the steps of spacing the plurality of transmit antennas such that spacing between adjacent antennas provides a spatial correlation coefficient greater than a threshold level; selecting by the transmitter, a selected subset of the plurality of transmit antennas for transmitting the pilot reference signals; and transmitting the pilot reference signals only from the selected subset of transmit antennas to a receiver.

In another embodiment, the present invention is directed to a method of channel estimation for a MIMO communication system in which a transmitter utilizes a plurality of transmit antennas. The method includes the steps of receiving by a receiver, pilot reference signals transmitted only from a selected subset of the plurality of transmit antennas; and deriving a channel estimation for all of the plurality of transmit antennas using spatial correlation among the plurality of transmit antennas.

In another embodiment, the invention is directed to a transmitter for transmitting pilot reference signals utilized by a receiver for channel estimation in a MIMO communication system. The transmitter includes a plurality of transmit antennas spaced such that spacing between adjacent antennas provides a spatial correlation coefficient greater than a threshold level; an antenna subset selector configured to select a subset of the plurality of transmit antennas for transmitting the pilot reference signals; and a radio frequency transmitter coupled to the selected subset of transmit antennas for transmitting the pilot reference signals only from the selected subset of transmit antennas to the receiver.

In another embodiment, the invention is directed to a receiver in a MIMO communication system in which a transmitter utilizes a plurality of transmit antennas. The receiver includes a radio frequency receiver configured to receive pilot reference signals transmitted only from a selected subset of the plurality of transmit antennas; and a channel estimator configured to derive a channel estimation for all of the plurality of transmit antennas using the received pilot reference signals and known or estimated spatial correlation among the plurality of transmit antennas.

In another embodiment, the invention is directed to a method of transmitting pilot reference signals utilized by a receiver for channel estimation in a MIMO communication system in which a transmitter utilizes a plurality of transmit antennas. The method includes the steps of selecting by the transmitter, a selected subset of the plurality of transmit antennas for transmitting the pilot reference signals; and transmitting the pilot reference signals only from the selected subset of transmit antennas through a propagation environment to a receiver; wherein the selecting step includes selecting transmit antennas at an interval in the spatial domain depending on scattering characteristics of the propagation environment such that the receiver can interpolate the channel over those antennas that do not transmit pilot reference signals.

An advantage of certain embodiments of the present invention is a significant reduction of the pilot overhead in a large scale MIMO system.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. Additionally, it should be understood that the invention may be implemented in hardware or in a combination of hardware and software in which a processor executes the steps of the invention when executing computer program instructions stored on a non-transitory memory.

Figure 1:
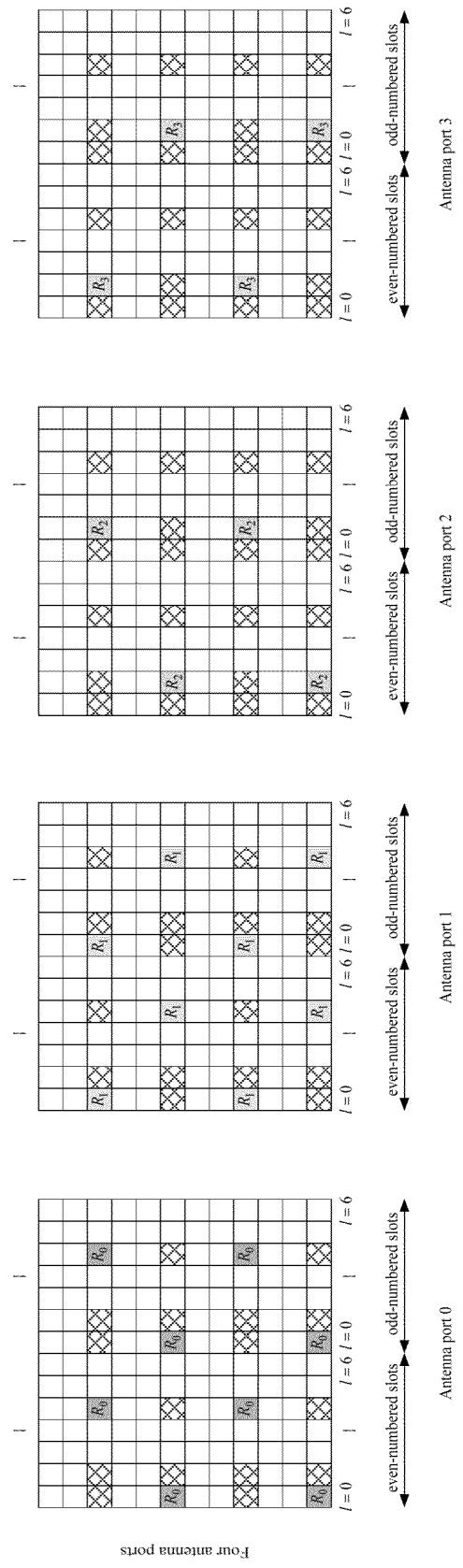
FIG. 1 (Prior Art) illustrates a transmission scheme for a pilot Reference Signal (RS) for MIMO in an LTE system.
Figure 2:
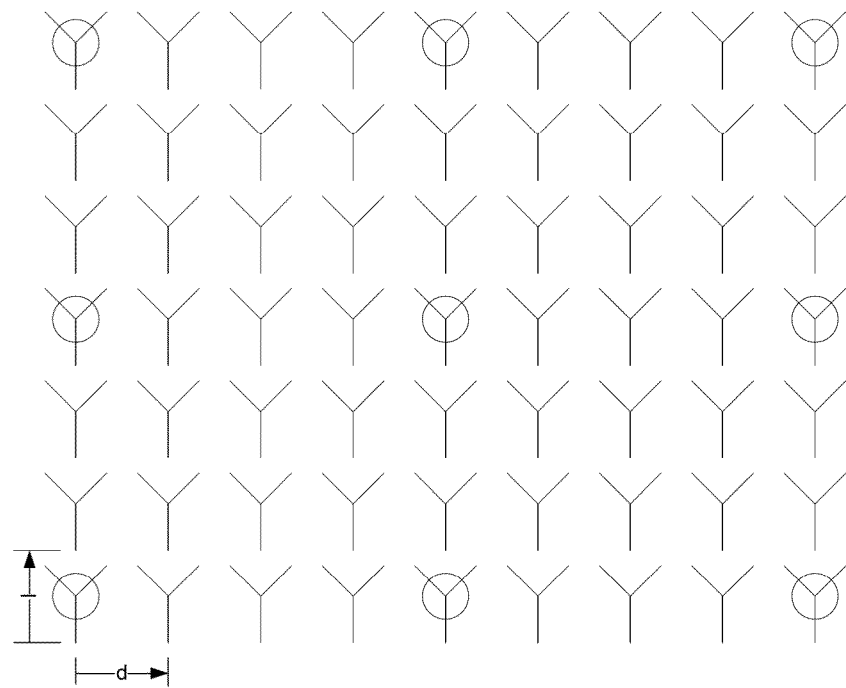
FIG. 2 is an illustrative drawing of an exemplary embodiment of the present invention in which pilot symbols are transmitted by only a subset of a plurality of antennas.

FIG. 2 is an illustrative drawing of an exemplary embodiment of the present invention in which pilot symbols are transmitted by only a subset of a plurality of antennas. The circled antennas illustrate the transmitting subset. In this embodiment, a processor exploits the spatial correlation among closely placed antennas to derive the channel estimation for all antennas. This spatial correlation may be estimated or may be known a priori. An estimator such as an MMSE, for example, may be used to interpolate the channel for antennas that do not transmit pilot symbols.

Figure 3:
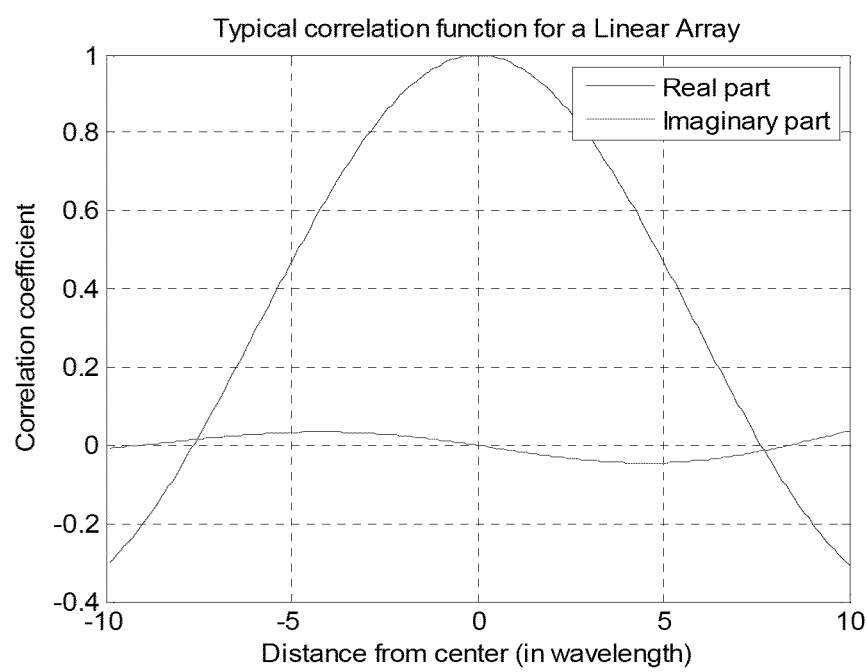
FIG. 3 is a graphical representation of a correlation coefficient of a linear antenna array as a function of the distance between a point and the center of the array.

FIG. 3 is a graphical representation of a correlation coefficient of a linear antenna array as a function of the distance between a point and the center of the array. It can be seen that the correlation coefficient becomes zero when the distance is approximately eight times the wavelength. Conversely, the correlation coefficient reaches unity when the distance is zero. Thus, if the separation between the antennas in the array is very small, the correlation is very high, and there is no need to transmit pilot signals on all of the antennas. A similar effect can be observed with two-dimensional arrays such as those arranged in a rectangular fashion as in FIG. 2, arrays arranged partly or wholly in cylindrical fashion, or arrays that may be arranged partly or wholly on the surface of an imagined sphere. The correlation function is then two-dimensional. Thus, the transmit antennas in the subset of transmit antennas may be selected such that spacing between the selected antennas provides a correlation coefficient greater than a threshold level such as, for example, 0.9.

Figure 4:
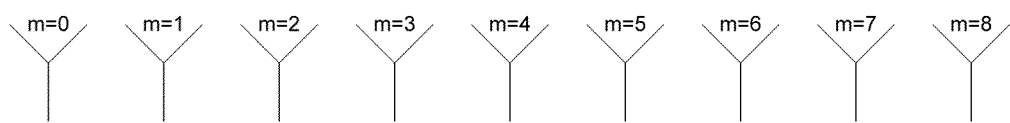
FIG. 4 is an illustrative drawing of a uniformly spaced linear antenna array.

FIG. 4 is an illustrative drawing of a uniformly spaced linear antenna array suitable for implementing an embodiment of the present invention. Extension to two-dimensional or even 3-dimensional arrays with arbitrary spacing is straightforward. Let $h_0(t_0,f_0,m_0)$ be the time-frequency channel response between transmit antenna $m_0$ and a certain receive antenna on a UE sampled at time $t_0$ and frequency $f_0$. Then the correlation between two such samples may be given by:

$$\rho(t_0,t_1,f_0,f_1,m_0,m_1)=E\{h_0(t_0,f_0,m_0)h_1^*(t_1,f_1,m_1)\} \quad (1)$$

In practice, this correlation is usually a function of the differences between the corresponding variables. In other words, $$\rho(t_0,t_1,f_0,f_1,m_0,m_1)=\tilde{\rho}(t_0-t_1,f_0-f_1,m_0-m_1) \quad (2)$$

for some function $\tilde{\rho}$. This fact has been widely accepted in the case of time-frequency channel response. The same is true for the case of a linear array when the size of the array is much smaller than the distance between the transmit and receive antennas.

In any case, the correlation function given in Equation (1) depends on the scattering environment and usually remains unchanged for a UE for an extended period of time. This is again widely accepted for the two-dimensional, time-frequency channel response. Therefore, it can be estimated and known a priori. Such correlation can be exploited in the spatial domain to achieve more efficient channel estimation for a very large scale MIMO system.

Transmission

Figure 5:
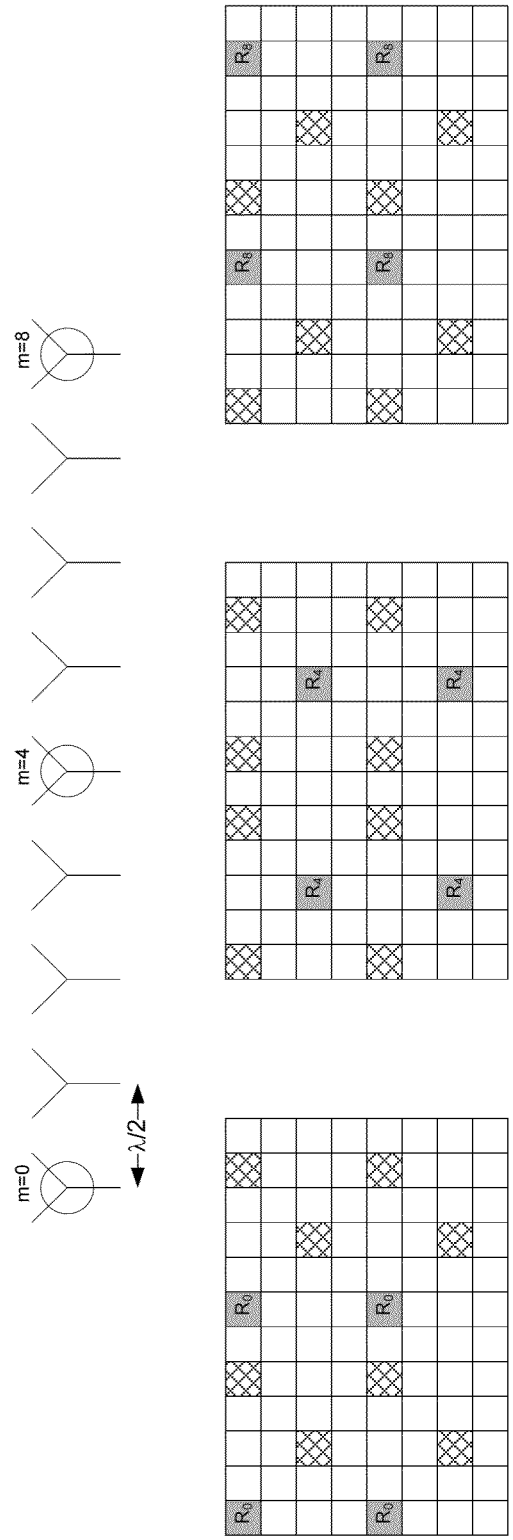
FIG. 5 illustrates a transmission scheme for transmitting pilot RSs from a subset of the antennas of FIG. 4 in an exemplary embodiment of the present invention.

FIG. 5 illustrates a transmission scheme for transmitting pilot RSs from a subset of the antennas of FIG. 4 in an exemplary embodiment of the present invention. Instead of transmitting pilots on all antennas, pilots are transmitted only on antennas 0, 4, and 8. These pilot symbols are marked by $R_0$, $R_4$, and $R_8$, respectively. They occupy orthogonal locations on the time-frequency plane, as in the case of an LTE RS. As indicated, the spacing between adjacent antenna elements is half a wavelength, the correlation between two adjacent elements is very high (>0.9 according to FIG. 3). Therefore, transmitting pilots on every $5^{th}$ antenna is more than adequate as can be easily verified by any well-designed channel estimator such as the one described below.

Another aspect of the present invention is that pilot signals may be transmitted in the spatial domain (whether 1-D, 2-D, or even 3-D arrays) with a density such that the receiver can interpolate the channel over those antennas that do not have pilot symbols, rather than spacing the antennas at a certain interval (such as half a wavelength) such that the pilot can be transmitted at a lower density. The pilot should be transmitted at an interval in the spatial domain depending on the scattering characteristics of the propagation environment.

In general, embodiments of the present invention transmit pilot signals only on every $T_{m,v}$ antennas in the vertical dimension and every $T_{m,h}$ antennas in the horizontal dimension to reduce pilot redundancy in a large-scale antenna array, where $T_{m,v}$ is inversely proportional to the transmit elevation angular spread, and $T_{m,h}$ is inversely proportional to the transmit azimuth angular spread.

Channel Estimation at the Receiver

Assuming the pilot symbols are all ones, the received signal $r_{P0}$ corresponding to the pilot symbol transmitted by antenna $m_{p_0}$ at time $t_{p_0}$ and frequency $f_{p_0}$ may be given by:

$$r_{P0}(t_{P0},f_{P0},m_{P0})=h_{P0}(t_{P0},f_{P0},m_{P0})+z_{P0}(t_{P0},f_{P0},m_{P0}) \quad (3)$$

where $z_{p_0}(t_{p_0},f_{p_0},m_{p_0})$ is the Additive White Gaussian Noise (AWGN) with variance $\sigma_z^2$, and $h_{p0}$ is the channel coefficient at p0, where p0 is a point in the time-frequency-antenna space at which a pilot signal is transmitted. The pilot signals have indices p0, p1, p2, . . . to distinguish from other indices at which data is transmitted. By arranging all the pilot observations in a column vector, the following is obtained:

$$\begin{bmatrix} r_{P_0} \\ \vdots \\ r_{P_N} \end{bmatrix} = \begin{bmatrix} h_{P_0} \\ \vdots \\ h_{P_N} \end{bmatrix} + \begin{bmatrix} z_{P_0} \\ \vdots \\ z_{P_N} \end{bmatrix} \quad (4)$$

or more concisely, $$r_p=h_p+z_p \quad (5)$$

The channel $h_0(t_0,f_0,m_0)$ at any time $t_0$, frequency $f_0$ for any given antenna $m_0$ can be estimated using an MMSE channel estimator given by:

$$\hat{h}_0=E\{h_0 h_p\}(E\{h_p h_p\}+\sigma_z^2 I)^{-1} r_p \quad (6)$$

Since the channel's correlation function is known, Equation (6) can be readily evaluated. Note that the channel's correlation function encompasses correlation in all three dimensions of time, frequency, and space (antenna). For a given time and frequency, the spatial correlation is the same as shown in FIG. 3. While it is known to exploiting the knowledge of correlation in time and frequency for pilot transmission and channel estimation, embodiments of the present invention exploit correlation in the spatial domain, which is heretofore unknown. The two additional dimensions of time and frequency are included above for completeness.

Note that there are low-complexity suboptimal alternatives to Equation (6). One such alternative is based on the Least Squares estimate. Equation (6) is given as an exemplary method of performing channel estimation for the inventive pilot transmission method.

Once the channel is estimated, the terminal may use it for demodulation of downlink transmissions. The receiver may also feed back the channel information to the transmitter for downlink pre-coding (beamforming). For example, the receiver may feed back a compressed version of the MIMO channel by extracting representative features such as delay-Doppler and angular response.

The present invention may be implemented in any appropriate type of telecommunication system supporting any suitable communication standards and using any suitable components.

Figure 6:
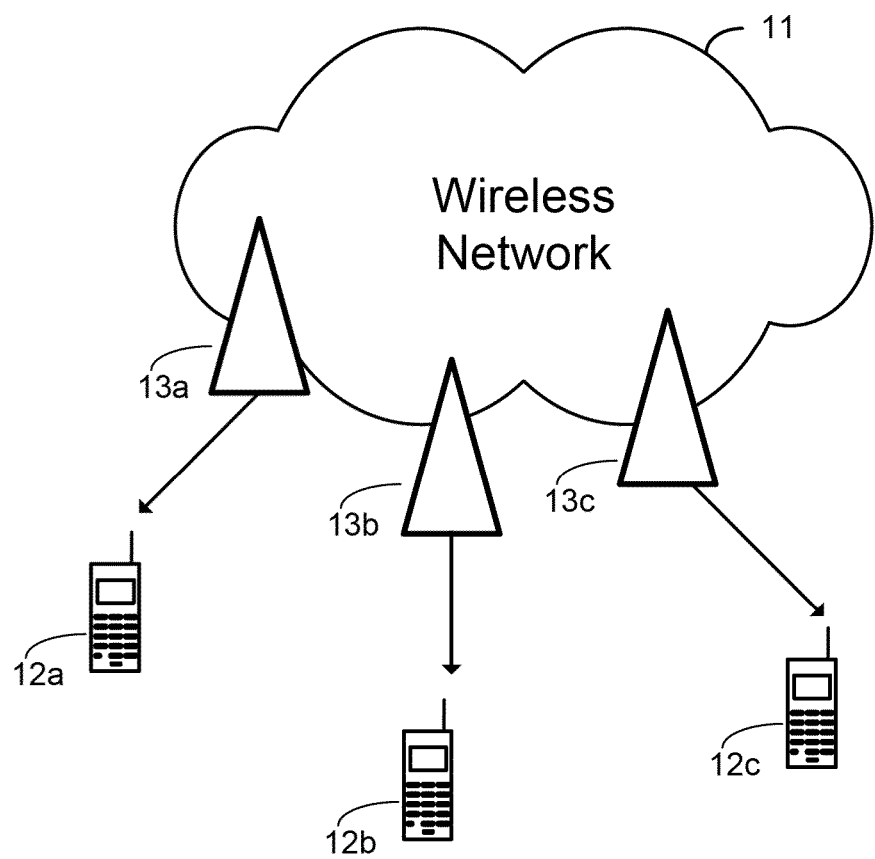
FIG. 6 illustrates a particular embodiment of the present invention implemented in an LTE network.

FIG. 6 illustrates a particular embodiment of the present invention implemented in an LTE network. As shown, an example network 11 may include one or more instances of user equipment (UEs) 12a-12c and one or more base stations 13a-13c capable of communicating with the UEs, along with any additional elements suitable to support communication between UEs or between a UE and another communication device (such as a landline telephone). The illustrated UEs may represent communication devices that include any suitable combination of hardware or combination of hardware and software.

Figure 7:
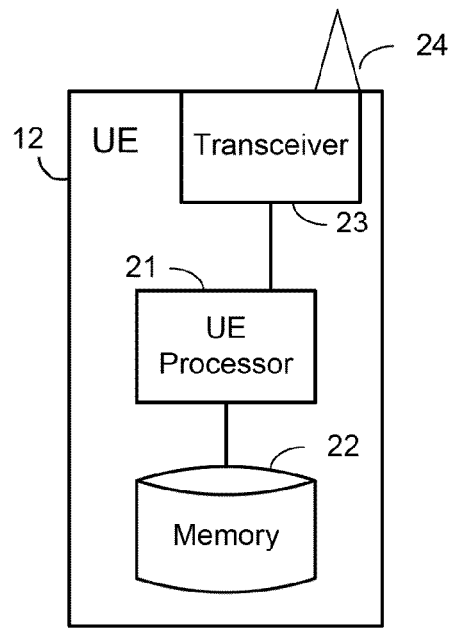
FIG. 7 is a simplified block diagram of an exemplary User Equipment (UE) for use with the present invention.

FIG. 7 is a simplified block diagram of an exemplary UE 12 for use with the present invention. The example UE may include a processor 21, a non-transitory memory 22, a transceiver 23, and an antenna 24. In particular embodiments, some or all of the functionality described above as being provided by mobile communication devices or other forms of UE may be provided by the UE processor 21 executing instructions stored on the non-transitory memory 22. Alternative embodiments of the UE may include additional components beyond those shown in FIG. 7 that may be responsible for providing certain aspects of the UE's functionality, including any of the functionality described above and/or any functionality necessary to support the embodiments of the present invention described above.

Figure 8:
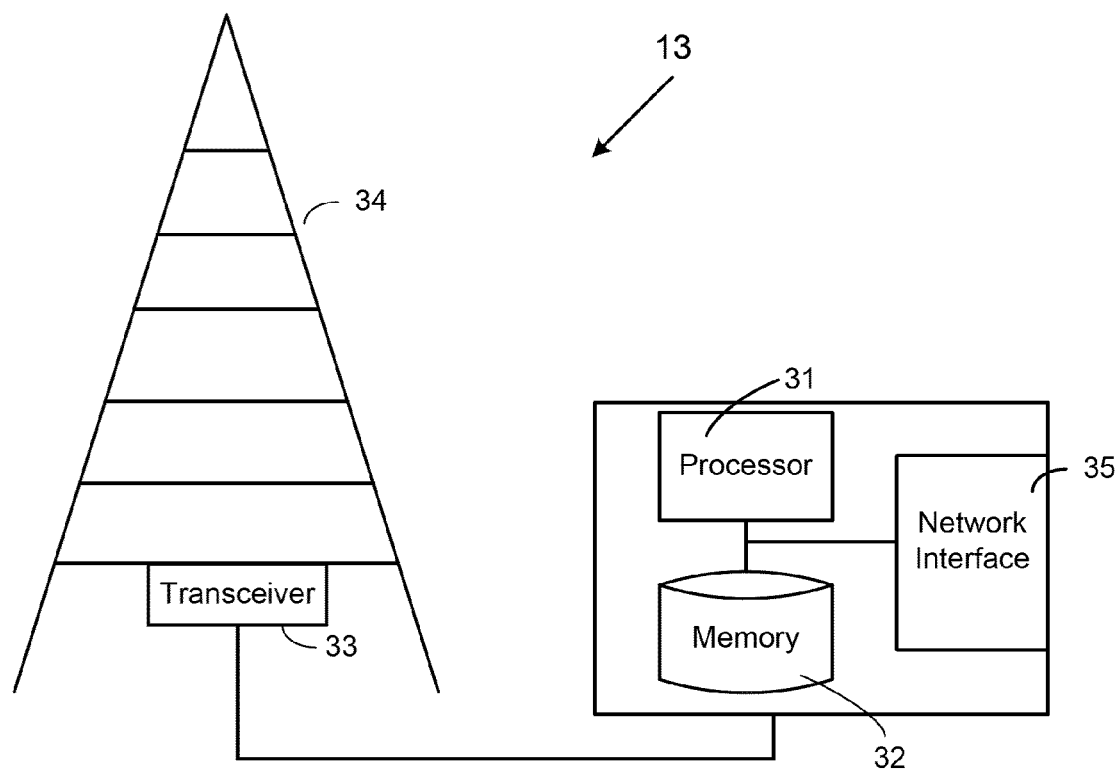
FIG. 8 is a simplified block diagram of an exemplary base station 13 for use with the present invention.

FIG. 8 is a simplified block diagram of an exemplary base station 13 for use with the present invention. The example base station may include a processor 31, a non-transitory memory 32, a transceiver 33, an antenna 34, and a network interface 35. In particular embodiments, some or all of the functionality described above as being provided by a mobile base station, a base station controller, a node B, an enhanced node B, and/or any other type of mobile communications node may be provided by the base station processor 31 executing instructions stored on the non-transitory memory 32. Alternative embodiments of the base station may include additional components responsible for providing additional functionality, including any of the functionality identified above and/or any functionality necessary to support the embodiments of the present invention described above.

Figure 9:
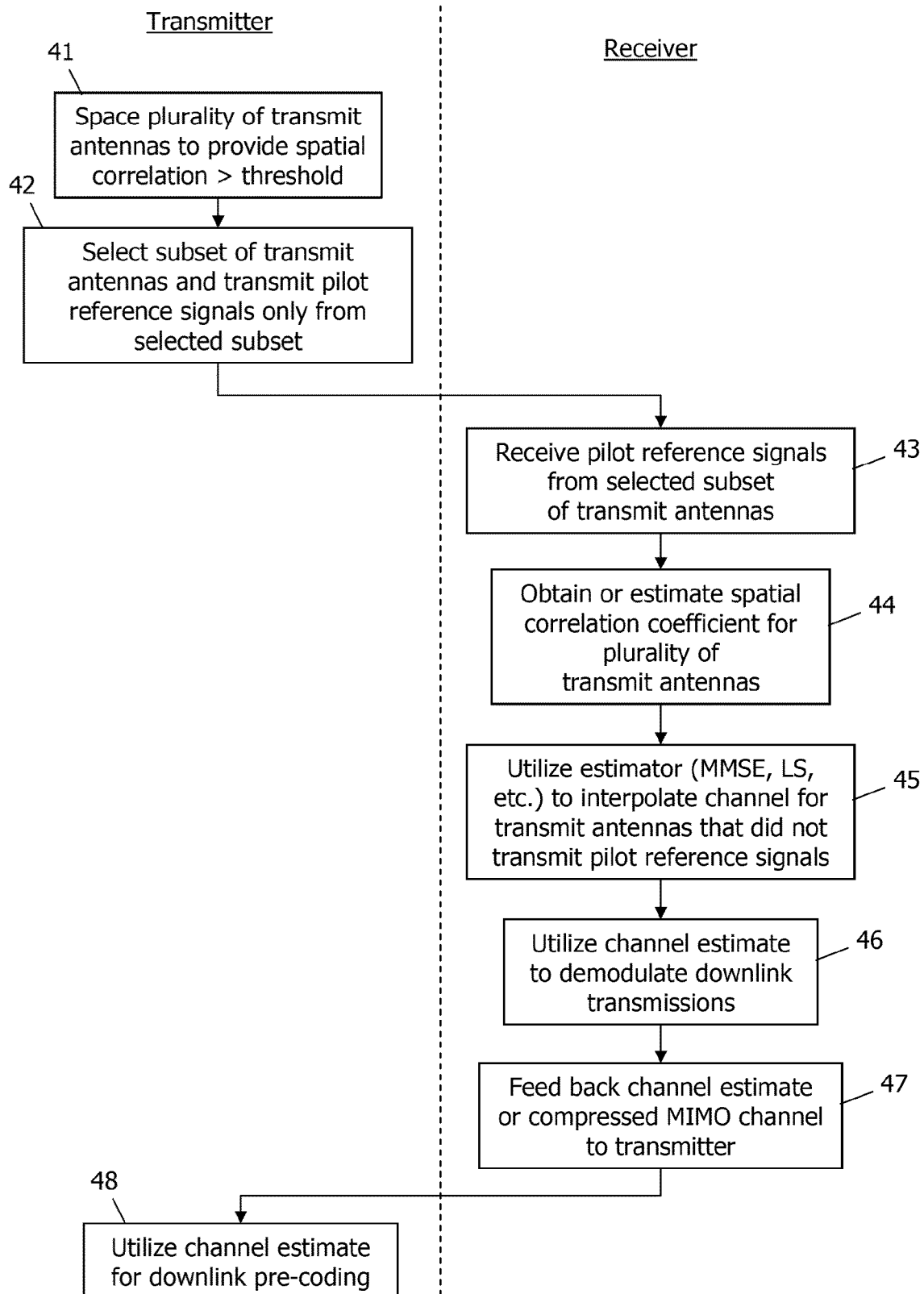
FIG. 9 is a flow chart illustrating the steps of an exemplary embodiment of the method of the present invention.

FIG. 9 is a flow chart illustrating the steps of an exemplary embodiment of the method of the present invention. At step 41, the antennas in a plurality of transmit antennas for a transmitter such as a base station are spaced so that they have good spatial correlation. A threshold value of the correlation coefficient may be predefined, and antennas may be spaced to provide a correlation coefficient greater than the threshold value. At step 42, a subset of the transmit antennas is selected, and the transmitter transmits pilot reference signals only from the selected subset of transmit antennas. At step 43, a receiver such as a UE receiver receives the pilot reference signals transmitted from the selected subset of transmit antennas. At step 44, the receiver obtains or estimates the spatial correlation coefficient for the selected subset of transmit antennas. At step 45, the receiver utilizes an estimator (MMSE, LS, etc.) to interpolate the channel for the transmit antennas that did not transmit the pilot reference signals. At step 46, the receiver utilizes the channel estimate to demodulate downlink transmissions. At step 47, the receiver may feed back the channel estimate or the compressed MIMO channel to the transmitter. At step 48, the transmitter may utilize the channel estimate for downlink pre-coding.

Figure 10:
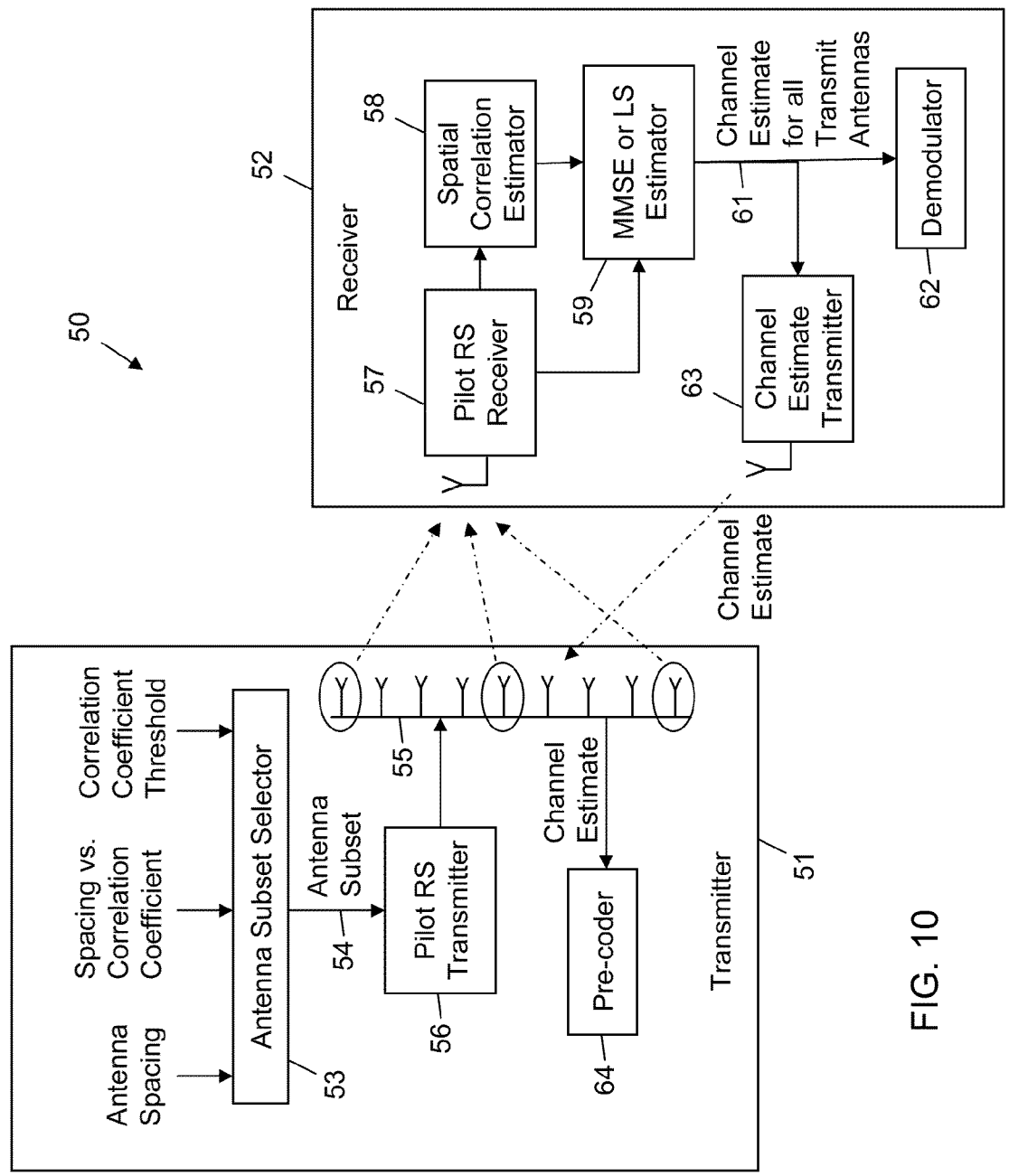
FIG. 10 is a simplified block diagram of an exemplary embodiment of the system 50 of the present invention.

FIG. 10 is a simplified block diagram of an exemplary embodiment of a system 50 of the present invention. The system may include a transmitter 51 and a receiver 52. Within the transmitter, an antenna subset selector 53 may receive as inputs or may store internally, knowledge of antenna element spacing, the relationship between spacing and the correlation coefficient, and the correlation coefficient threshold. From this knowledge, the antenna subset selector selects a subset 54 of the transmit antennas 55 to transmit pilot RSs. A pilot RS transmitter 56 then transmits pilot RSs on the selected subset of (circled) transmit antennas.

Within the receiver 52, a pilot RS receiver 57 receives the pilot RS from the selected subset of transmit antennas. The receiver obtains spatial correlation information or utilizes a spatial correlation estimator 58 to estimate the spatial correlation coefficient for the plurality of transmit antennas. The received signal and the spatial correlation coefficient are input to a channel estimator such as an MMSE or LS estimator 59, which interpolates the channel for the transmit antennas that did not transmit the pilot RSs. The resulting channel estimate 61 is then provided to a demodulator 62 to demodulate downlink transmissions.

The receiver 52 may also feed back the channel estimate or the compressed MIMO channel to the transmitter 51 for use in pre-coding. In this event, the resulting channel estimate may be provided to a channel estimate transmitter 63, which transmits the channel estimate to the transmitter. Within the transmitter, the channel estimate is received and provided to a pre-coder 64 to assist with downlink pre-coding.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of transmitting pilot reference signals utilized by a receiver for channel estimation in a Multiple-Input Multiple-Output (MIMO) communication system in which a transmitter utilizes a plurality of transmit antennas, the method comprising the steps of:

spacing the plurality of transmit antennas such that spacing between adjacent antennas provides a spatial correlation coefficient greater than a threshold level;

selecting by the transmitter, a selected subset of the plurality of transmit antennas for transmitting the pilot reference signals; and transmitting the pilot reference signals only from the selected subset of transmit antennas through a propagation environment to a receiver;

wherein the selecting step includes selecting transmit antennas at an interval in the spatial domain depending on scattering characteristics of the propagation environment, wherein the interval between selected transmit antennas is greater than adjacent antennas, but still provides a density of transmitted pilot signals sufficient to enable the receiver to interpolate the channel over those antennas that do not transmit pilot reference signals.

2. The method as recited in claim 1, wherein the plurality of transmit antennas is arranged in an array having a vertical dimension and a horizontal dimension, and the selecting step reduces redundancy of the pilot reference signals in the array by:

selecting every $T_{m,v}$ antennas in the vertical dimension; and
selecting every $T_{m,h}$ antennas in the horizontal dimension;
where $T_{m,v}$ is inversely proportional to a transmit elevation angular spread, and $T_{m,h}$ is inversely proportional to a transmit azimuth angular spread.

3. The method as recited in claim 1, wherein the spacing between adjacent antennas is equal to or less than one-half wavelength of the transmitted pilot reference signals.

4. A transmitter for transmitting pilot reference signals utilized by a receiver for channel estimation in a Multiple-Input Multiple-Output (MIMO) communication system, the transmitter comprising:
- a plurality of transmit antennas spaced such that spacing between adjacent antennas provides a spatial correlation coefficient greater than a threshold level;
- an antenna subset selector configured to select a subset of the plurality of transmit antennas for transmitting the pilot reference signals; and
- a radio frequency transmitter coupled to the selected subset of transmit antennas and configured to transmit the pilot reference signals only from the selected subset of transmit antennas through a propagation environment to the receiver;
- wherein the antenna subset selector is configured to select transmit antennas at an interval in the spatial domain depending on scattering characteristics of the propagation environment, wherein the interval between selected transmit antennas is greater than adjacent antennas, but still provides a density of transmitted pilot signals sufficient to enable the receiver to interpolate the channel over those antennas that do not transmit pilot reference signals.

5. The transmitter as recited in claim 4, wherein the plurality of transmit antennas is arranged in an array having a vertical dimension and a horizontal dimension, and the selecting step reduces redundancy of the pilot reference signals in the array by:
- selecting every $T_{m,v}$ antennas in the vertical dimension; and
- selecting every $T_{m,h}$ antennas in the horizontal dimension;
- where $T_{m,v}$ is inversely proportional to a transmit elevation angular spread, and $T_{m,h}$ is inversely proportional to a transmit azimuth angular spread.

6. The transmitter as recited in claim 4, wherein the spacing between adjacent antennas is equal to or less than one-half wavelength of the transmitted pilot reference signals.

* * * * *